United States Patent [19]

Hanson

[11] Patent Number: 5,066,454
[45] Date of Patent: Nov. 19, 1991

[54] ISOSTATIC PROCESSING WITH SHROUDED MELT-AWAY MANDREL

[75] Inventor: Andrew D. Hanson, Derry, N.H.

[73] Assignee: Industrial Materials Technology, Inc., Andover, Mass.

[21] Appl. No.: 540,683

[22] Filed: Jun. 20, 1990

[51] Int. Cl.$^5$ .............................................. B22F 1/00
[52] U.S. Cl. ....................................... 419/42; 419/49; 419/68
[58] Field of Search ............................. 419/42, 49, 68

[56] References Cited

U.S. PATENT DOCUMENTS 3,907,949  9/1975  Carlson .................................. 264/63
4,341,557  7/1982  Lizenby ................................. 419/49

Primary Examiner—Stephen J. Lechert, Jr.
Attorney, Agent, or Firm—James E. Maslow

[57] ABSTRACT

A melt-away mandrel is disclosed for use in an isostatic pressing process and a flexible sleeve is disclosed for use with the melt-away mandrel. The mandrel is used during pressing of compactible material and then the mandrel is melted away leaving the compacted part. Preferably the sleeve covers the mandrel and this assembly is loaded along with a material charge in a cold isostatic pressing apparatus. The sleeve protects the powder charge from contamination from the material of the mandrel. The isostatic pressing process for forming an uncontaminated part includes assembling the melt-away mandrel in the flexible sleeve, placing the sleeve and mandrel assembly in a containment vessel with the material charge, and submitting the material charge and sleeve and mandrel assembly to pressure for compacting the material charge against the sleeve. After the mandrel is melted, the sleeve is peeled away from the pressed material.

15 Claims, 1 Drawing Sheet

ISOSTATIC PROCESSING WITH SHROUDED MELT-AWAY MANDREL

BACKGROUND OF THE INVENTION

This invention relates to isostatic processing of compactible materials.

Cold isostatic pressing is one process of choice for forming components from particulate materials. In cold isostatic pressing, a powder charge is loaded into an elastomeric mold (called a "bag"). The bag can be considered as a hermetically sealed pressure transfer membrane. The bag is sealed after filling, positioned within the containment vessel, and is exposed to a fluid environment.

The bag may be part of the pressure vessel (dry bag process) or may be a separate, independent unit placed within the pressure vessel (wet bag process). In either case, a mandrel may be included within the bag to aid in forming details on the resulting pressed material In operation, the fluid is pressurized and in turn applies a hydrostatic pressure to the bag. If a mandrel is included inside the bag, then the pressure compacts the powder against the mandrel. Upon completion of the pressing process, the vessel and bag are opened and the part (called a "compact") is separated from the mandrel. The compact is then thermally treated, sintered, to increase strength through diffusion bonding.

This process results in near net shaping of components with uniform as-pressed densities in addition to inherent advantages of particulate materials processing. Isostatic pressing is also advantageous for forming components with large cross-sectional areas, or components with large length-to-diameter ratios, since the process is limited only by the capacity of the pressure vessel.

SUMMARY OF THE INVENTION

The present invention discloses use of a melt-away mandrel in an isostatic pressing process. A preferred embodiment includes use of an elastomeric sleeve to prevent wicking of the mandrel material into the compacted material.

In one aspect of the invention, a process for isostatic pressing of compactible materials includes enclosing a material charge to be compacted and a melt-away mandrel in a flexible containment bag, sealing the bag from a fluid environment in a pressurization vessel, applying pressure via the fluid to the bag to cause compaction of the material against the mandrel, and applying heat to the compacted material and mandrel until the compacted material and mandrel are separated without fracturing or uncompacting the compacted material, whereby a part having complex form can be made in an isostatic compaction process. In this aspect of the invention, the process is preferably cold isostatic pressing and the pressed material is of a kind which preferably cannot be wetted with the mandrel material.

In another aspect of the invention, a flexible sleeve (or shroud) is interposed between the material charge and melt-away mandrel to prevent wicking of the mandrel material into the presse material. The sleeve shrouds the mandrel and prevents the material charge from contacting the mandrel during processing. The sleeve is provided with flexible walls which during pressing assume the contour of the mandrel face against which it is pressed, thus to permit the mandrel to impress detailing on the pressed material. The mandrel is formed of a low melting point material and the sleeve is formed of material having a degradation point above the melting point of the mandrel.

In another aspect of the invention, an isostatic pressing process for shaping a compact from a material charge, employing a melt-away mandrel, includes the step of placing or forming a mandrel in a flexible sleeve, placing the sleeve-mandrel assembly in a pressure vessel along with a material charge, and submitting the material-sleeve-mandrel assembly to pressurized fluid for compacting the material against the sleeve. The containment vessel is filled with fluid and the fluid is pressurized to achieve the material compaction. After the compaction step, the formed material, or compact, may be sintered.

This aspect may include the subsequent step of heating the compacted material-sleeve-mandrel combination until the melting point of the mandrel to melt the mandrel away from the sleeve. The sleeve and shaped compact may then be separated. Preferably the melting point of the mandrel is below the degradation temperature of the sleeve or compacted material. A containment bag may be used to hold the material, sleeve, and mandrel. The sleeve may be formed of RTV rubber, natural rubber, urethane or other elastomeric, abrasion-resistant material The mandrel may be formed of low melting point fusible alloy material such as a tin-bismuth-lead-cadmium alloy exhibiting predictable size change upon heating and cooling. The material charge may include particulate material or powder.

In another aspect of the invention, an isostatic pressing process for forming a shaped part from a material charge, employing a melt-away mandrel, includes the steps of placing the material and mandrel in a bag in a pressure containment vessel with a sleeve between the mandrel and the material, compacting the material against the sleeve, heating the compacted material-sleeve-mandrel combination to the melting point of the mandrel, and removing the sleeve from the formed part. This aspect may include the step of post-compaction thermal treatment of the formed part for promotion of diffusion bonding.

As a result of various asPects of the invention, by use of a sleeve and meltable mandrel, it is now possible to obtain the precision and complex geometry unavailable with conventional solid, extractable mandrels along with the increased size capacity of cold isostatic pressing, and without contamination of the formed part with material from the melted mandrel. Therefore, another aspect of the invention includes a part formed according to this aspect.

Preferably, the sleeve is a thin-walled elastomeric material having a desired shape, for example, a bottleneck configuration, and is filled with a molten, low melting point fusible alloy to form the mandrel. The mandrel may also be formed from a wax material, or other suitable meltable substances. The sleeve-mandrel assembly provides a detail-bearing compression surface against which the material charge can be formed, for example having a bottleneck interior.

Other features and advantages will become apparent from the following detailed description when read in connection with the accompanying drawings

DETAILED DESCRIPTION OF THE PREFERRED EMBODIMENT

We have developed a variant of isostatic pressing which now includes use of a melt-away mandrel. This is beneficial in the formation of compacts having internal patterns, cavities, or re-entrant angles, for example. Such complex forms make it difficult or impossible to remove a solid mandrel from the compact. Preferably the invention is employed in cold isostatic pressing of compactible materials.

A preferred process for isostatic pressing of compactible materials includes enclosing a material charge to be compacted and a melt-away mandrel in a flexible containment bag, sealing the bag in a fluid environment in a pressurization vessel, applying pressure via the fluid to the bag to cause compaction of the material against the mandrel, and applying heat to the compacted material and mandrel until the compacted material and mandrel are separated without fracturing or uncompacting the compacted material.

In practice, the mandrel and compact are removed from the bag as a unit and are then submitted together to the melt-away process prior to follow-on sintering. Heating causes the mandrel to melt while leaving the compact intact. A typical melt-away mandrel is formed from a variety of fusible alloys with low melting points. These alloys usually include combinations of tin, bismuth, lead or cadmium, but may also include other materials, such as wax, plastic or frozen fluid or material.

The foregoing arrangement works best with non-wettable material. However, some powders, especially when compacted, exhibit a capillary attraction to materials which become liquid during heating. Therefore, in use of a melt-away mandrel it is possible that some of the molten mandrel material will wick into the compact through capillary action during the mandrel melting process. This wicked material is a contaminant which can have detrimental effects on down-stream processing and final chemistry characteristics of the finished part.

Figure 1:
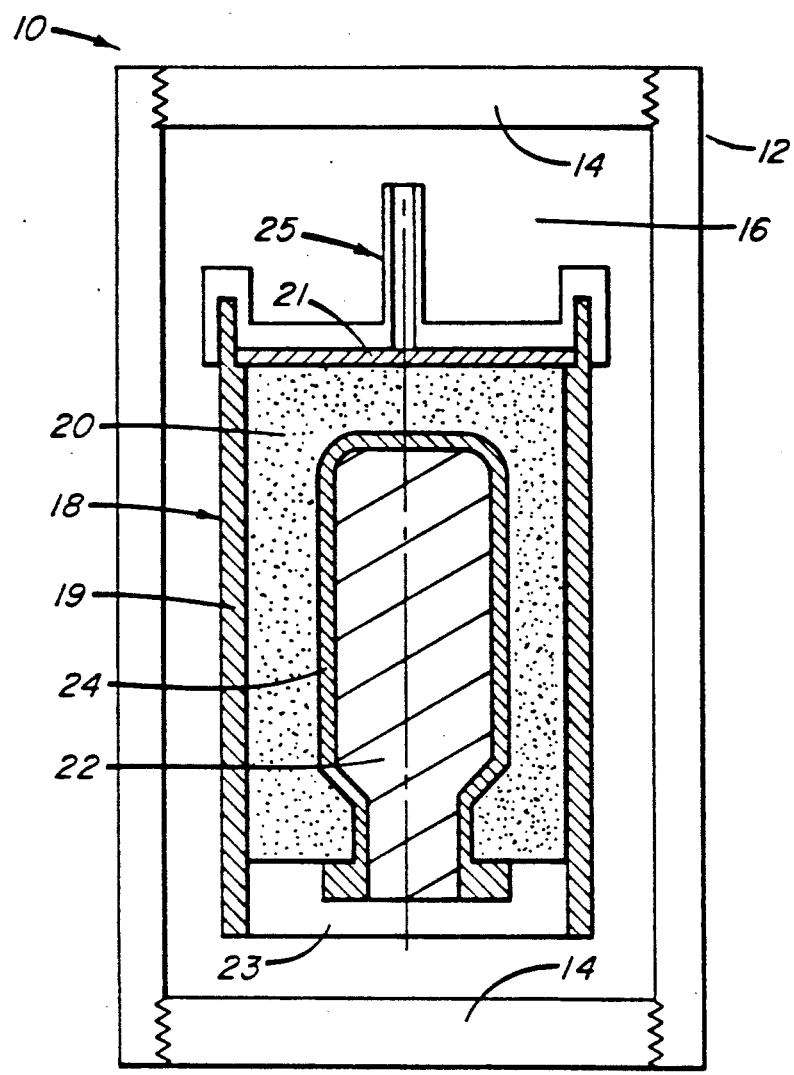
FIG. 1 is a cross-sectional view of a cold isostatic pressing apparatus employing the present invention.

Therefore, a preferred cold isostatic processing arrangement 10 is shown in cross-section in FIG. 1, prior to compaction of the particulate material charge 20. The pressure vessel 12 includes mating closures or caps 14. A conventional elastomeric containment bag 18 is loaded with both the powder 20 and a melt-away mandrel 22.

Preferably, an elastomeric sleeve 24 is interposed between the powder and mandrel. The sleeve acts as a barrier which inhibits contamination of the compact when the melt-away mandrel is melted after the compaction process.

The sleeve can be provided either with or without detailed features on its sidewall If the sleeve is formed without details, then any detail to be imposed upon the compact during processing must be supplied by the mandrel.

In FIG. 1, both the sleeve and mandrel have detailing. In particular, sleeve 24 is a cylindrical container having a wraparound sidewall 24a tapering to a bottleneck orifice 24b and the mandrel is formed in a corresponding milk bottle configuration.

Alternatively, the sleeve can be formed having details expressed in its sidewall, as such details are desired to be imparted to the pressed compact. Here, the mandrel simply acts as a stiffener for the sleeve. The mandrel is preferably fitted or formed in the sleeve, such as by pouring the molten mandrel material into the sleeve and allowing it to harden.

Figure 2:
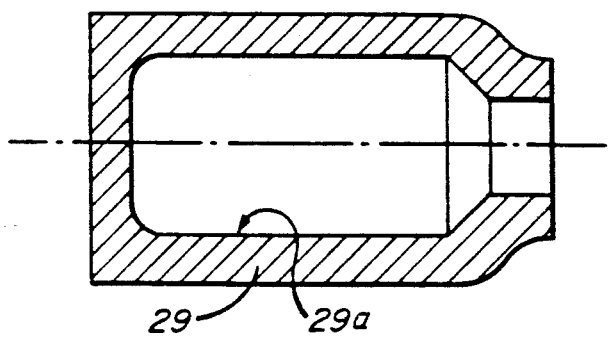
FIG. 2 is a side cross-section of a compact formed according to the arrangement of FIG. 1.

In practice, the shrouded mandrel is assembled into an elastomeric containment bag 18 along with powder material charge 20. The bag includes a cylindrical body section 19, cap 21 and base 23. Bag 18 is sealed and placed in the pressure vessel 12. The bag is evacuated via port 25 in cap 21. Room temperature, pressurized fluid 16 is applied to the vessel via a fluid pressure device (not shown). This causes hydrostatic compaction of bag 18 and the material charge contained in the bag. Hence, the charge is consolidated against the mandrel with the sleeve 24 as an intermediary. As shown in FIG. 2, the compact 29 is thus formed having the detail provided by the sleeve-mandrel combination.

Subsequently, the pressure is relieved and the bag-compact-sleeve-mandrel combination is removed from the pressure vessel. The outer bag 18 is removed. The compact-sleeve-mandrel combination then is heated, so as to melt away the solid mandrel, but without degrading the elastomeric sleeve 24. After melting away the mandrel 22, the sleeve 24 may be removed by pulling or peeling it from the internal cavity 29a of comPact 29. The comPact can then be further processed, such as via conventional sintering.

Sleeve 24 may be formed by injection molding of RTV rubber or dip molding natural rubber or pourable urethane materials, for example. Preferably the sleeve is configured to withstand the compressive forces of processing, typically 5,000 to 100,000 psi, without excessive spring back, and also to withstand the temperatures of mandrel melting, typically 150°-500° F.

In one experiment, a component part was fabricated from titanium 6AL-6V-2Sn powder using an room temperature vulcanizing rubber sleeve and a tin-bismuth melt-away mandrel. The sleeve was formed via injection molding. The mandrel was configured in a milk bottle form. The compact was formed with an inverted milk bottle internal cavity with a cylindrical exterior. The mandrel was then melted at 290° F. The sleeve was easily pulled from the interior of the compact. The compact was then sintered.

The present invention is adaptable to various processing techniques, including wet and dry bag processing and variants thereof. Other embodiments are within the following claims.

What is claimed is:

1. A process for isostatic pressing of compactible material including the steps of enclosing a material charge to be compacted and a melt-away mandrel in a flexible containment bag, sealing the bag from a fluid environment in a pressurization vessel, applying pressure via the fluid to the bag to cause hydrostatic compaction of the material against the mandrel, and applying heat to the compacted material and mandrel until the compacted material and mandrel are separated without fracturing or uncompacting the compacted material, whereby a part having complex form can be made in an isostatic compaction process.

2. The process of claim 1 wherein the compactible material is non-wettable by the heated mandrel.

3. An isostatic pressing process for forming a part from a material charge, the process comprising the steps of:
   (a) assembling a melt-away mandrel in a flexible sleeve,
   (b) placing the sleeve and mandrel assembly in a containment vessel with a material charge, and
   (c) submitting the material charge and sleeve and mandrel assembly to pressurized fluid for compacting the material charge against the sleeve.

4. The process of claim 3 further comprising the step of heating the combined compacted material charge and the sleeve and mandrel assembly until the melting point of the mandrel to melt the mandrel.

5. The process of claim 4 wherein the melting point of the mandrel is below the degradation temperature of the sleeve or compacted material.

6. The process of claim 4 further including the step of removing the sleeve from the interior of the compact.

7. The process of claim 3 wherein step (b) is preceded by placing the material charge and the sleeve and mandrel assembly in a containment bag.

8. The process of claim 3 wherein step (b) is preceded by placing the material charge and the sleeve and mandrel assembly in a containment bag and sealing the pressure vessel.

9. The process of claim 3 wherein the process is performed at ambient temperatures characteristic of cold isostatic pressing.

10. The process of claim 3 wherein the sleeve is comprised of room temperature vulcanizing rubber, natural rubber, urethane or other elastomeric, abrasion-resistant material.

11. The process of claim 3 wherein the mandrel is comprised of low melting point fusible alloy material such as a tin-bismuth-lead-cadmium alloy exhibiting predictable size change upon heating and cooling.

12. The process of claim 3 wherein the material charge is comprised of particulate and/or compressible material.

13. The process of claim 3 further comprising the step of sintering the compacted material.

14. An isostatic pressing process for forming a component part from a material charge, the process comprising the steps of:
   placing the material and a melt-away mandrel in a bag in a pressure containment vessel with a sleeve between the mandrel and the material,
   compacting the material against the sleeve,
   heating the compacted material-sleeve-mandrel combination to the melting point of the mandrel, and
   removing the sleeve from the formed part.

15. The process of claim 14 wherein the material charge includes particulate material and further including the step of post-compaction thermal treatment of the formed part for promotion of diffusion bonding of the particulate materials within the part.

* * * * *